May 28, 1963 C. T. HATHAWAY 3,090,991
BIAXIAL ORIENTATION APPARATUS
Filed Jan. 3, 1961 3 Sheets-Sheet 2

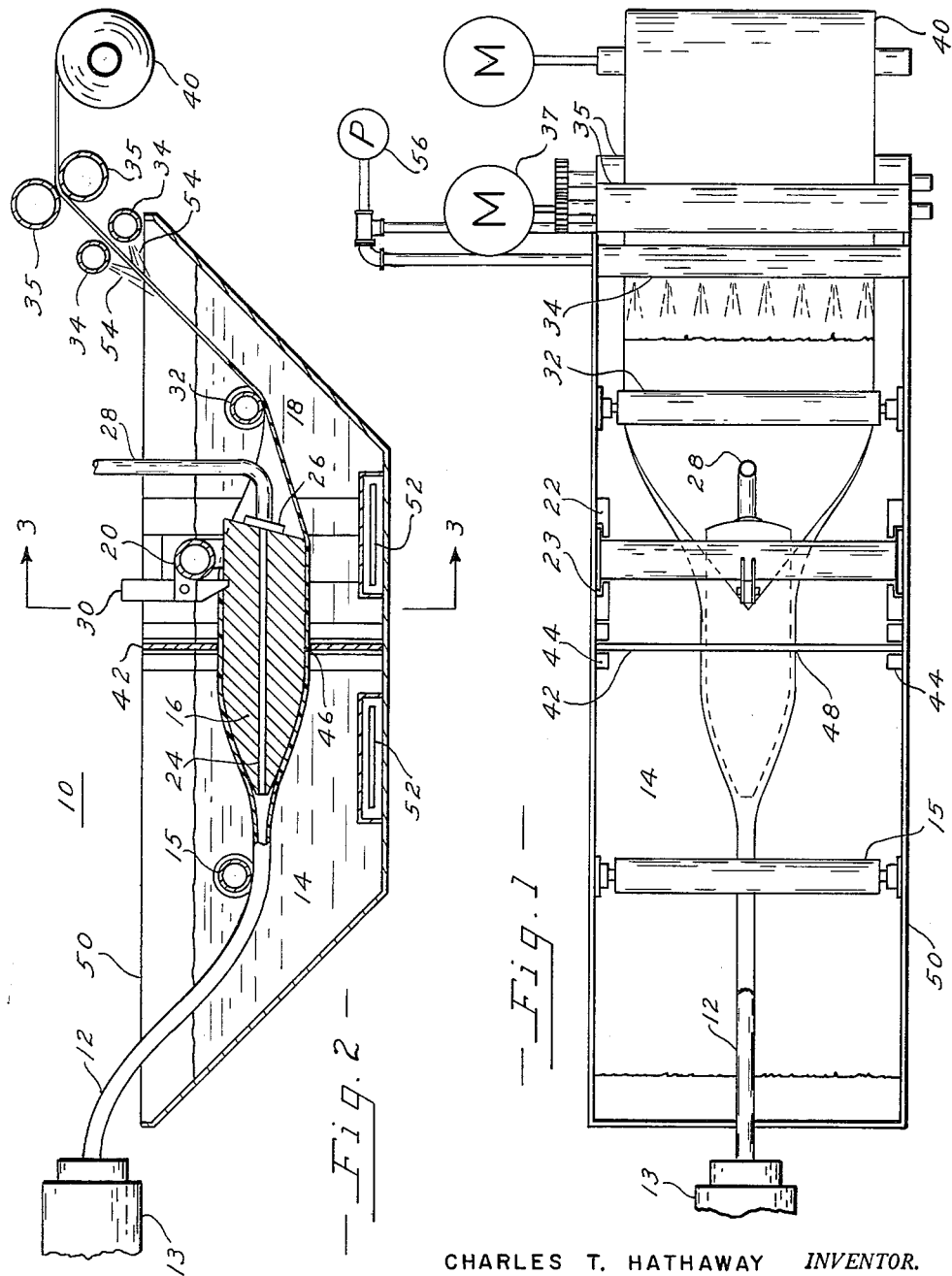

CHARLES T. HATHAWAY INVENTOR.

BY *Cornelius H. Cleary*
ATTORNEY.

CHARLES T. HATHAWAY INVENTOR.

BY Cornelius H. Cleary

ATTORNEY.

3,090,991
BIAXIAL ORIENTATION APPARATUS
Charles T. Hathaway, Springfield, Mass., assignor to Monsanto Chemical Company, St. Louis, Mo., a corporation of Delaware
Filed Jan. 3, 1961, Ser. No. 80,466
7 Claims. (Cl. 18—1)

The present invention is directed to introducing biaxial orientation into thermoplastic materials and more particularly to apparatus and processes with which to attain this end.

The biaxial orientation to which the present invention is directed, and which is generally known, can be described as involving the use of apparatus having a mandrel over which a tubular member of thermoplastic material is drawn, causing it to be simultaneously distended along its lateral and longitudinal axis. The mandrel can be a solid, liquid or gas, however, while the gas-type mandrel is the most convenient and commonly used, the solid form ensures greater uniformity of orientation because of the stability of its configuration.

To date, the use of solid-type mandrels in stretch orientation of the type described above, has been accompanied by a number of difficulties. Perhaps the most important of these results from build-up of frictional forces formed between the mandrel and the material being advanced. This causes loss in uniformity of the gauge or thickness of the material and lack of planar uniformity in the thermoplastic material so oriented.

Another serious situation, which actually presents itself regardless of the type of orientation practiced, involves loss of orientation or return to normal by the material after orientation has been introduced. The stretch orientation step is usually carried out under elevated temperature, more specifically, at or above the glassy transition temperature, $T_{(g)}$ or that temperature at which the thermoplastic material is easily deformed. Thereafter, until the temperature drops below $T_{(g)}$ the stretched material must be maintained in stretched condition, through use of tension, etc., or return to normal will take place. The use of rapid cooling, in which the temperature is dropped rapidly below $T_{(g)}$, can be used to help in alleviating this problem, and as a result various expedients such as air blast cooling, provided in close proximity in time and location to the orientation step, have been relied upon. By contrast, however, liquid baths which are relatively cheap to maintain, have not been used to cool the material and nevertheless ensure substantial retention of orientation.

Accordingly, it is a principal object of the present invention to provide stretch orientation apparatus, relying upon a solid mandrel, and method for its use, by which to continuously introduce biaxial orientation into thermoplastic material in tubular form.

Another object is to provide the said apparatus and process which are capable of continuously introducing biaxial orientation into thermoplastic materials, and thereafter substantially retaining the said orientation.

Still other objects of the invention will in part be obvious and will in part appear hereinafter.

These and other objects are attained through utilization of stretch orientation apparatus comprising in combination a liquid orientation bath and a liquid cooling bath in tandem relationship having a submerged solid mandrel longitudinally disposed between the said baths with the advance end of said mandrel located within the orientation bath, the said mandrel in turn exhibiting cross-sectionally a continuous outside curvature. Intercommunication between the orientation and cooling baths is provided through an annular orifice formed peripherally of said mandrel, the said orifice having an effective radial extension substantially equal to the desired thickness or gauge of the thermoplastic material. The solid mandrel is provided with a bore exiting at the advance end of the same, and preferably is in longitudinal relationship thereto. The bore is designed for the purpose of introducing liquid to the interior of said tube. During practice of the stretch orientation method, the liquid provided in the orientation bath as well as that introduced to the interior of the tube is maintained at a temperature at least as high as the glassy transition temperature of the thermoplastic material, while the liquid provided in the cooling bath is maintained at a temperature below said glassy transition temperature.

For a fuller understanding of the nature and objects of the invention reference should be had to the following detailed description taken in connection with the accompanying drawings in which:

FIGURE 1 is a plan view, partly in section with parts broken, illustrating an embodiment of the present invention.

FIGURE 2 is a side elevation, partly in section, with parts broken, corresponding to FIGURE 1.

Figure 3:
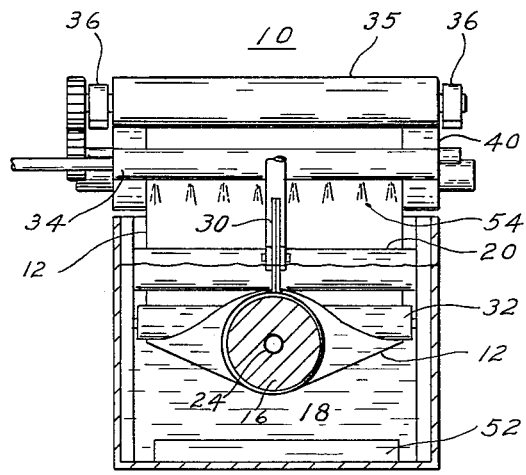
FIGURE 3 is a rear elevation, partly in section, with parts broken, taken along the lines 3—3 of FIGURE 2.

Turning to the drawings wherein like numbers refer to like parts throughout and first to FIGURES 1–5, an embodiment of the present invention is shown generally as 10, in conjunction with thermoplastic material 12 being advanced in tubular form from a conventional-type extruder 13 utilizing an annular die, the latter not shown. Material 12 is caused to advance into and through orientation tank 14. The advance of thermoplastic material 12 within bath 14 is shown facilitated by guide roll 15, however, the circumstance of the operation can be such that other guides may be used, it being understood, however, that the use of any such expedient is optional and can be completely eliminated. Within orientation bath 14 the tubular interfaces of thermoplastic material 12 register with and are drawn over or around the advance end of mandrel 16, and, advance of material 12 is continued over the mandrel 16 while maintaining this circumscribed relationship.

Mandrel 16 is shown positioned in longitudinal disposition extending rearwardly into cooling bath 18. A support member 20 is provided to position mandrel 16. To facilitate this, channelled flanges 22—22 are stationed at the sides of said bath 18 and support member 20 is provided with end configurations complementing each channelling 23 in a given flange 22. Other means can also be provided with which to adjust the longitudinal, lateral or transversal and elevational positioning of mandrel 16.

Mandrel 16 is provided with a bore 24 exiting to the advance end of said mandrel 16. Bore 24 preferably exits in essentially longitudinal axial relationship of said mandrel 16 and in effect truncates slightly the otherwise tapered advance end of the said mandrel. The diameter of bore 24 is shown of exaggerated size, it being sufficient for proper performance that it be capable of allowing introduction of liquid to the interior of the tube of thermoplastic material 12. A coupling 26 provides connection with which to attach stand pipe 28, which is in turn connected to a source of said liquid, not shown.

With further advance over said mandrel 16, and after its entry into cooling bath 18, the tube of material 12 is directed to contact knife or slitting means 30 which slits the tube to allow it to take a flat sheet or film form. Thereafter, thermoplastic material 12 in sheet form is led under guide roll 32 and between a pair of air knives 34—34 which are designed to return any transported liquid back along material 12 and into bath 18. Other expedients such as doctor knives and the like may be substituted for air knives 34—34.

A pair of actuating rolls 35—35 are shown journalled to supports 36—36 and driven by motor 37. These are designed to institute and maintain advancement of the material 12 through apparatus 10. Preferably, rolls 35—35 are driven at surface speeds sufficient to provide orientation along the longitudinal axis of material 12 substantially simultaneous to the orientation being continuously introduced into the transversal axis of material 12 as it advances over mandrel 16.

Various other expedients, such as guide rolls and tensioners, etc., may be included at various stages in apparatus 10 to direct or guide the advance of material 12. After passage through actuating rolls 35—35 thermoplastic material 12 is disposed of in any convenient manner as for instance by winding it onto wind-up roll 40.

Apparatus 10 as shown includes orientation bath 14 and cooling bath 18 in tandem relationship separated by divider 42 which is in turn supported by flange members 44—44. Alternatively, a number of dividers, or a baffle arrangement can be used. As shown particularly in FIGURES 4–5 divider 42 is provided with a centrally located aperture 46 having a configuration corresponding and of slightly larger diameter than that of the cross-sectional configuration of mandrel 16. As a result mandrel 16 can be positioned within aperture 46 to define an essentially annular orifice 48. While mandrel 16 exhibits cross-sectionally a continuous outside curvature and so preferably has a circular cross-sectional configuration, other configurations such as elliptical, with aperture 46 having a corresponding shape, can be used. The effective radial width of annular orifice 48 is essentially equal to the predetermined gauge or thickness of thermoplastic material 12. By adjusting mandrel 16, which is provided in turn with a tapered or coned, and more preferably, a parabolically shaped advance end, it is possible to vary the radial width of annular orifice 48, when this is desired, as for example to adjust to operations on thermoplastic materials of different thicknesses or gauges. Actually, mandrel 16 can be tapered over its entire length, but, need only be so at the advance end thereof. For illustrative purposes the tapering is shown limited to the advance end of mandrel 16.

Baths 14 and 18 are generally conventional as to outside construction 50—50 and configuration. In order to facilitate temperature control heat exchangers 52 shown generally can be utilized. In addition, insulation, covers for the baths 14 and 18, liquid circulation pumps and like expedients, none of which are shown, can be provided as desired.

Air knives 34—34 are shown at the exit end of apparatus 10 taking the form of hollow cylinders disposed at the top and bottom surfaces of material 12. Along the periphery of each cylinder and directed rearward of the advance of material 12 a row of orifices 54—54 are located with which to direct a stream of air or gas in turn causing transported bath liquid to retreat back along material 12 and ultimately into bath 18. In conjunction therewith pump 56 provides compressed gas with which the air knives perform this function.

Figures 4, 5:
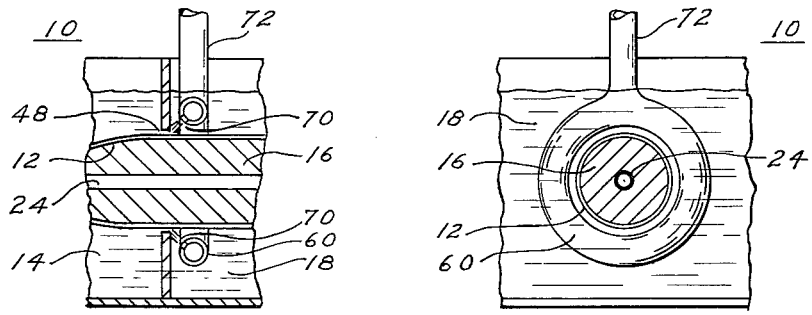
FIGURE 4 is a fragmentary side elevation, with parts broken, illustrating another embodiment of the present invention.
FIGURE 5 is a fragmentary rear elevation, with parts broken, corresponding to FIGURE 4.

In the embodiment shown in FIGURES 4 and 5 a ring-shaped or annularly defined cylinder 60 cross-sectionally circumscribes mandrel 16 radially removed from mandrel 16 a distance substantially equal and preferably slightly greater than the gauge of material 12. Cylinder 60 is provided with a plurality of nozzle members 70—70 with which to direct a liquid, preferably of corresponding or lower temperatures and composition to that contained in bath 18, toward annular orifice 48, orientation bath 14 or material 12. Pipe 72 is shown which in turn leads to a pump and source of said liquid, not here illustrated.

Mandrel 16 is constructed from solid materials such as various metals exemplified by steel, nickel alloys, etc., which are capable of retaining their configurations at temperatures occasioned in the stretching operation. The outside surfaces of the mandrel, particularly those on the tapered advance end and extending back through orifice 48, can be polished, coated or otherwise treated to insure a smooth surface with which to minimize build-up of friction.

Figure 6:
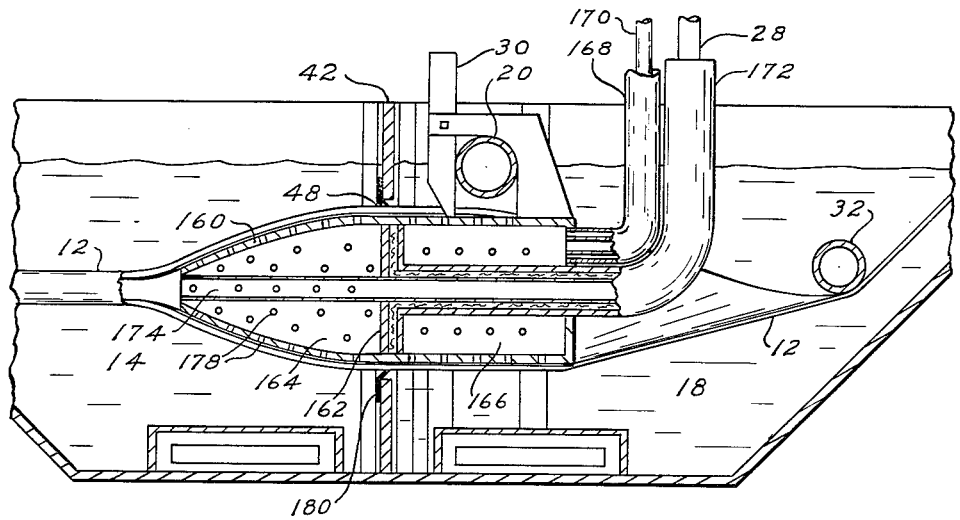
FIGURE 6 is a side elevation showing a separate embodiment of a mandrel and divider for use in practice of the present invention.

In the embodiment shown in FIGURE 6 mandrel 160 is provided with a hollowed interior, divided by means of baffle 162 into a fore heated zone 164 and an after cooled zone 166. These zones are located respectively within orientation bath 14 and cooling bath 18. Stand pipe 168 serves to provide liquid coolant to cooling zone 166 while pipe 170 located coaxially and internally of pipe 168 is designed to remove the coolant and return it for refrigeration by means not shown. Standpipe 28, provided with insulation jacketing 172, serves to introduce heated liquid to the heated interior zone 164. Bore 24 now defined by pipe 174, again exits through the advance end of mandrel 160. In addition, pipe 174 is provided with a number of holes through which the heated liquid passes from bore 24 into heated zone 164. In order that the heated liquid, or lubricant can pass from heated zone 164 through the shell of mandrel 160 a plurality of holes or pores 178, 178 are provided. In this manner, lubrication between the interior surface of the tube of thermoplastic material 12 and mandrel 160 is augmented.

Bath divider 42 then in the embodiment shown in FIGURE 6 can have a flexible gasket 180 in order to provide aperture 48 with flexibility as to its radial width.

Operation of biaxial orientation apparatus 10, will now be considered in relationship to the embodiment shown in FIGURES 1–3, as previously disclosed. In anticipation of use, baths 14 and 18 are provided with liquids in which material 12 is substantially insoluble. For example, when the thermoplastic material constituting the tube is polystyrene, liquids such as ethylene glycol, tetraethylene glycol, polyethylene glycol and the like, can be used. Sufficient liquid is provided in the baths to completely immerse mandrel 16. Orientation bath 14 is provided with a temperature at least as high as the glassy transition temperature of the material. To illustrate this, the orientation of polystyrene is generally carried out at a temperature above 105° C. More particularly, the orientation temperature for polystyrene is in the range of 105 to 130° C., with a further preference that it be maintained on the order of 120° C. The liquid in cooling bath 18 is provided with a temperature below that of the glassy transition temperature or; considered with respect to polystyrene, 10 to 80° C. less than that of the liquid in the orientation bath, and preferably less than 90° C.

Mandrel 16 is positioned within aperture 46 in the previously described fashion in order to provide an annular orifice 48, the radial thickness of which is essentially equal to the predetermined gauge of the thermoplastic sheet to be obtained. This can be done before or while thermoplastic material 12 is being initially charged or threaded. After threading material 12 through apparatus 10, continuous operation can be enjoyed. Simultaneous with the remainder of the operation, liquid, preferably the same as that utilized in baths 14 and 18 and having a temperature substantially that of orientation bath 14, is introduced to the tubular interfaces of thermoplastic material 12 through the agency of pipe 28 and bore 24 located to the interior of mandrel 16. The amount of liquid and the pressure under which it is caused to be exited at the advance end of mandrel 16 need only be sufficient so that a continuous supply is provided between the interior face of material 12 and the exterior of mandrel 16.

The description set forth above has illustrated the apparatus and process presently sponsored with respect to polystyrene. However, readily appreciated changes in the apparatus particularly changes in temperatures of the baths and the use of other liquids will adapt the apparatus for use in orienting other thermoplastic materials.

The glassy transition temperature $T_{(g)}$ referred to previously is that temperature, above which thermoplastic materials change from glassy to rubbery state. This temperature may actually range over a few degrees. When providing orientation in noncrystalline thermoplastic materials which include polystyrene, methyl methacrylate, various acrylates, polyvinyl chloride and others, a temperature substantially equal or slightly greater than the glassy transition temperature is maintained. With respect to crystalline thermoplastic materials such as nylon, polyethylene, polypropylene, polyvinyl fluoride, crystalline polystyrene (isotactic) form, it is sometimes more desirable to carry out the orientation at a temperature slightly greater than the melting temperature $T_{(m)}$ of the material, although it is equally possible to carry out orientation at the previously described lower operating area, that approximating $T_{(g)}$.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description and shown in the accompanying drawing shall be interpreted as illustrative and not in a limiting sense.

What is claimed is:

1. Apparatus for continuously providing biaxial orientation in a tube of thermoplastic material comprising in combination liquid containing orientation bath and a cooling bath separated by a divider and positioned in tandem relationship having a submerged solid mandrel longitudinally disposed through an opening in said divider in both of said baths with the advance end of said mandrel located within said orientation bath, said mandrel exhibiting a continuous outside cross-sectional curvature with intercommunication between said baths through an annular orifice defined by the radial width between the periphery of the mandrel and the edge of the divider opening, said radial width being substantially equal to the predetermined thickness of said tube, an open bore exiting at the advance end of said mandrel for the introduction of liquid to the interior of said tube, said orientation bath and said liquid being introduced to the interior of said tube being maintained at a temperature at least as high as the glassy transition temperature of said material, and the cooling bath being maintained at a temperature less than said glassy transition temperature.

2. The apparatus according to claim 1 wherein an annularly defined cylinder is located within said cooling bath and cross-sectionally circumscribes said mandrel a distance substantially equal to the predetermined gauge of said thermoplastic material, said cylinder being provided with a plurality of nozzles for directing a liquid toward said annular orifice.

3. A process for continuously providing biaxial orientation in a tube of thermoplastic material which comprises selectively advancing said tube over a submerged mandrel longitudinally disposed in a liquid containing orientation bath and a cooling bath with the advance end of said mandrel located within said orientation bath, said mandrel having an open bore exiting at the advance end thereof, said baths intercommunicating by means of an annular orifice formed peripherally of said mandrel and having a radial extension substantially equal to the thickness of said tube, and simultaneously introducing liquid to the interior of said tube from the open bore exiting at the advanced end of said mandrel, said orientation bath and said liquid being introduced to the interior of said tube being maintained at a temperature equal at least to the glassy transition temperature of said thermoplastic material, and the cooling bath being maintained at a temperature less than said glassy transition temperature.

4. A process for continuously providing biaxial orientation in a tube of polystyrene which comprises selectively advancing said tube over a submerged mandrel exhibiting cross-sectionally a continuous outside curvature and longitudinally disposed between liquid containing orientation bath and a cooling bath with the advance end of said mandrel being located within said orientation bath, said mandrel having an open bore exiting at the advance end thereof, said baths intercommunicating by means of an annular orifice formed peripherally of said mandrel and having a radial extension substantially equal to the thickness of said tube, and simultaneously introducing liquid to the interior of said tube from the open bore exiting at the advanced end of said mandrel, said orientation bath and said liquid introduced to the interior of said tube being maintained at a temperature greater than about 105° C., and the cooling bath being maintained at a temperature 10–30° C., less than the temperature of said orientation bath.

5. A process according to claim 4 wherein the orientation bath is maintained at a temperature in the range of 105° C.–130° C.

6. A process according to claim 4 wherein said orientation bath is maintained at a temperature on the order of 120° C.

7. A process according to claim 4 wherein the cooling bath is maintained at a temperature less than 90° C.

References Cited in the file of this patent
FOREIGN PATENTS 962,719    Germany _____ Apr. 25, 1957

OTHER REFERENCES

Bailey, "Stretch Orientation of Polystyrene and Its Interesting Results," from India Rubber World, May 1948, pp. 225–231.